W. SUMNER.
CLUTCH.
APPLICATION FILED OCT. 24, 1921.
1,436,830.
Patented Nov. 28, 1922.
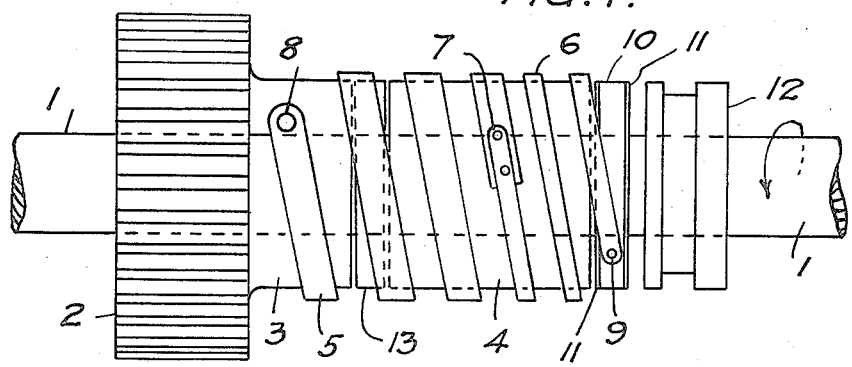
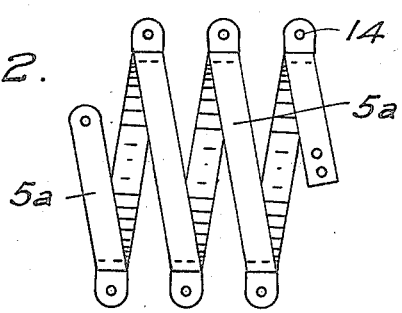
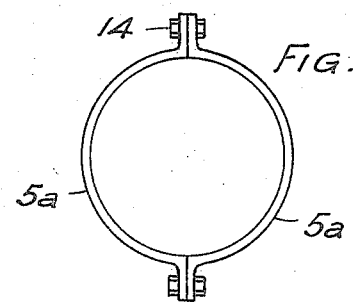
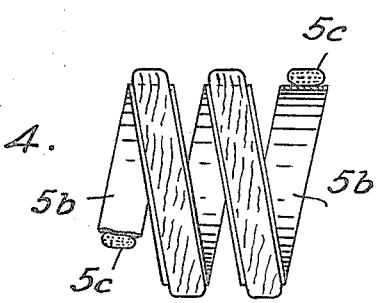
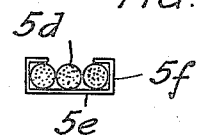
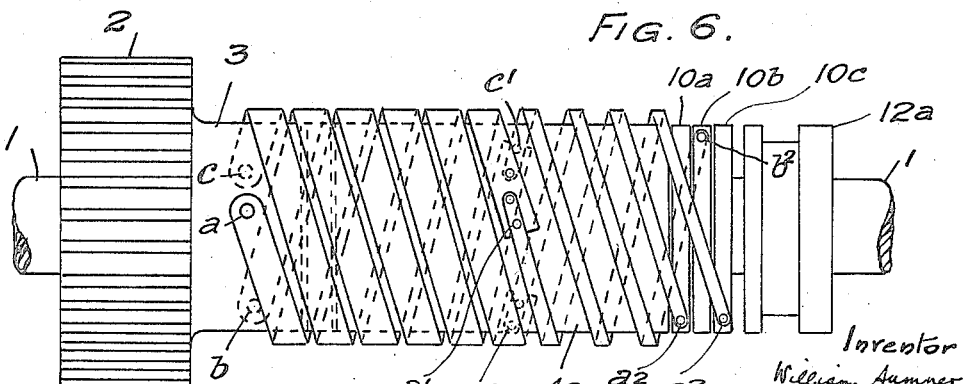
Inventor
William Sumner
By his Attorney
A. J. Davies.

Patented Nov. 28, 1922.

1,436,830

UNITED STATES PATENT OFFICE.

WILLIAM SUMNER, OF LIVERPOOL, ENGLAND.

CLUTCH.

Application filed October 24, 1921. Serial No. 510,107.

*To all whom it may concern:*

Be it known that I, WILLIAM SUMNER, a subject of the King of Great Britain, and a resident of Liverpool, England, have invented certain new and useful Improvements in Clutches, of which the following is a specification.

This invention relates to improvements in clutches or the like couplings for rotatively connecting together shafts or the like of the type in which a contractible coil is employed to clutch the driven element to the driving shaft. The present invention is designed to enable such clutches to be utilized for high power drives.

According to this invention, the driving shaft has the element to be clutched thereto mounted loosely thereon and such element is provided with an extended boss. Fixed on the driving shaft is a collar of the same diameter as the extended boss of the element to be clutched and a band coil is secured to the boss of the element to be clutched and is wound helically round such boss and the collar fixed on the driving shaft. In order that such clutch may be used for heavy drives this helical coil must be made of stout section and it is found that the necessary winding up or contraction of the coil cannot be effectively done if the clutch is made in the ordinary way. To overcome this difficulty, therefore, the end of the coil of stout section is connected by a lighter coil of several turns to a ring or collar loose on the shaft, this loose ring being preferably of some material such as leather or having leather faced sides so that it may be lightly gripped against the fixed collar by a slidable sleeve on the shaft. To put the clutch in, the slidable sleeve is moved towards the fixed collar on the shaft so that the friction ring is nipped slightly, this action winding up the primary or light helical coil and ultimately winding up also the stouter coil, so that the frictional grip of the stout coil round the adjoining fixed collar and boss of the loose element to be clutched couples them together and the element is driven rotatively. Further features of the invention relate to means for building up the heavier part of the coil in such manner that it may be more readily positioned round the shaft.

The invention is illustrated in the accompanying drawings in which Fig. 1 is a diagrammatic elevation showing the clutch adapted to couple a pinion and shaft, Figs. 2 and 3 being a side view and end view, respectively, showing how the heavy coil of the clutch may be built up from sections. Fig. 4 is a fragmentary elevation, partly in section, showing a modified construction of the heavier coil of the clutch, while Fig. 5 is a cross section through a further constructional form of this coil. Fig. 6 is a view analogous to Fig. 1 of a multiple coil clutch.

In carrying out the invention the driving shaft or the like element 1 has the driven element 2, here shown as a pinion, mounted loosely thereon.

The element 2 has an extended boss 3, and fixed on or integral with the shaft 1 is a collar 4 of the same diameter as the boss 3. A helical band coil, comprising a secondary coil 5 of stout section and a primary coil 6 of lighter section coupled together at 7, is connected at 8 to the boss 3 of the loose element 2 and at 9 to a disc or ring 10 loose on the shaft. This loose ring 10 is preferably of some material such as leather or having leather faced sides 11 so that it may have a frictional drag against the fixed collar 4 when lightly pressed by a sleeve 12 slidable on the shaft 1 and operated by a fork or the like of any usual description. Another loose ring 13 may be disposed between the boss 3 and the collar 4 fixed on the shaft 1.

In operation, in order to put the clutch in to connect rotarily the loose element 2 and the shaft 1, the slidable sleeve 12 is moved towards the fixed collar 4, this action gripping the friction ring 10 lightly against the collar so that the friction ring is taken round with the shaft in the direction of the arrow, Fig. 1, winding up the primary light coil 6 to grip the collar 4 and ultimately also winding up the stout coil 5 on the collar 4 so that the frictional grip of the stout coil 5 round the collar 4 and the boss 3 of the loose element couples such boss 3 to the collar 4 and so clutches the loose element 2 to the shaft. Similarly, to free the clutch the sleeve 12 is moved away longitudinally from the friction ring 10 permitting the resilience of the coils 5, 6, to assert itself and free the loose element 2 from the shaft 1. If desired, the ring 13 may be eliminated and the fixed collar 4 arranged to abut against the boss 3.

By making the clutch coil composite, as described, it is found that the lighter primary coil enables the heavier section coil 5 to be brought more effectively into and out of action. In order to enable the heavier coil to be more readily positioned round the elements to be clutched together it may be made up of a series of sections $5^a$, Figs. 2 and 3, connected together by bolts 14 so as to provide a flexible continuous coil element, the links or the like of the coil being of a resilient nature. Such sectional construction of the coil may be effected by providing as shown a series of curved segments $5^a$ of helical twist and shaped to fit the parts to be clutched, such sections having at their ends interconnecting means of any suitable construction. If desired, as shown in Fig. 4, the heavy coil may be made of a comparatively thin bandlike element $5^b$ to give flexibility, on to the outside of which is fitted a heavy wire, coiled bar, or stranded wire rope $5^c$ to take the tensile stress, the freeing of the coil being effected by the inner bandlike resilient element. In this way a very strong type of coil is secured, which at the same time has the necessary resilience to free itself quickly when required to be disengaged. Or the heavy coil may be made entirely of a stranded wire cable of flattened section, such cable, owing to the natural resiliency of the several wires, retaining considerable rigidity so as to readily free itself and yet be strong enough to take a considerable load.

If desired, when the heavy coil is made up of several cables $5^d$ laid side by side they may be encased in a sheet metal sheath $5^e$ having upturned side flanges $5^f$.

Where the heavy coil is built up of a series of segments $5^a$ Figs. 2 and 3, if the curvature of any one segment be semi-cylindrical, or less than a semi-circle, or even when greater than a semi-circle, the segments may be readily positioned round the boss and connected, the segments when of more than semicylindrical shape being capable of being sprung to the small extent requisite to fit them round the fixed collar and extended boss of the driven element.

Such a type of clutch may be made with multiple coils as shown in Fig. 6, where the element 2 is, as before, loose on the shaft 1, three separate coils being provided the stouter sections of which are connected at the points $a$, $b$, $c$, to the boss 3 of the element 2, each coil being in turn coupled at $a^1$, $b^1$, $c^1$, to lighter primary coils which are connected at $a^2$, $b^2$, $c^2$, to three separate friction rings $10^a$, $10^b$, and $10^c$, loose on the shaft 1, and, if desired, leather faced as previously described, a sleeve $12^a$ operated by a fork or the like being adapted to be slid longitudinally on the shaft 1 to put the clutch in or out of gear. The loose friction rings $10^a$, $10^b$ and $10^c$, are pressed against the keyed collar $4^a$ thus causing the winding up of the three primary lighter coils and ultimately the winding of the heavier section coils to clutch the extended boss 3 of the element 2 to the collar $4^a$ and consequently to the shaft 1. Such a construction would be adopted where a very heavy drive has to be communicated through the clutch.

While the shaft 1 has been described as the driving element adapted to be clutched to the driven pinion 2, obviously this arrangement could be reversed and the pinion 2 be the driving element adapted to be clutched to the shaft 1.

The invention may be applied to machines such as rubber roller mills, or other roller mills which require starting and stopping under full load such as have been previously provided with dog clutches, these latter clutches having been found impossible to disengage when carrying full load.

I claim—

A clutch comprising, a shaft, an element loose on the shaft, a boss on the element, a ring loose on the shaft, a collar fixed on the shaft of the same diameter as the boss on the element and disposed between the element and the ring, a helical coil coupling the element to the ring, said coil having a strong section built up of separate segments and a weaker section, and means for retarding the ring.

In testimony whereof I affix my signature in presence of two witnesses.

WILLIAM SUMNER.

Witnesses:
 E. HEGINBOTHAM,
 A. J. DAVIES.